(12) United States Patent
Desai (10) Patent No.: US 7,355,758 B2
(45) Date of Patent: Apr. 8, 2008

(54) AUTOMATED FACSIMILE MONITORING AND DISPLAYING METHODS AND RELATED SYSTEMS

(75) Inventor: Wealthy Desai, Atlanta, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 884 days.

(21) Appl. No.: 10/460,131

(22) Filed: Jun. 12, 2003

(65) Prior Publication Data

US 2004/0252348 A1 Dec. 16, 2004

(51) Int. Cl.
H04N 1/00 (2006.01)
G06F 11/00 (2006.01)
G06F 11/30 (2006.01)
H04M 3/08 (2006.01)
H04M 3/10 (2006.01)

(52) U.S. Cl. .................. 358/400; 358/1.15; 358/402; 358/404; 358/405; 345/1.1; 345/2.1; 379/100.06; 379/100.08; 379/100.12; 379/100.15; 379/102.02; 399/8; 399/9; 399/10; 714/18; 714/723

(58) Field of Classification Search ............... 358/1.15, 358/404, 405, 400, 402; 379/100.06, 100.08, 379/100.12, 100.15, 102.02; 345/1.1, 2.1; 714/18, 723; 399/8–10
See application file for complete search history.

(56) References Cited

U.S. PATENT DOCUMENTS

| 4,797,706 A | * | 1/1989 | Sugishima et al. ......... 358/300 |
| 5,280,366 A | * | 1/1994 | Araki ......................... 358/453 |
| 5,579,126 A | * | 11/1996 | Otsuka ....................... 358/403 |
| 5,661,569 A | * | 8/1997 | Yamanaka .................. 358/442 |
| 5,790,639 A | * | 8/1998 | Ranalli et al. ......... 379/100.08 |
| 5,828,465 A | * | 10/1998 | Muramatsu et al. ........ 358/400 |

(Continued)

FOREIGN PATENT DOCUMENTS

JP 09-297721 * 11/1997

(Continued)

OTHER PUBLICATIONS

Faxination for Microsoft Exchange, Fenestrae® , http://www.amrein.com/EXCHANGE/fenestra.htm, (Oct. 14, 2000), pp. 1-5.*

(Continued)

*Primary Examiner*—Aung S. Moe
*Assistant Examiner*—Beniyam Menberu
(74) *Attorney, Agent, or Firm*—Myers Bigel Sibley & Sajovec (57) ABSTRACT

Automated facsimile monitoring methods, systems, and computer program products can track response data from multiple facsimiles sent to different locations and generate electronically accessible failure reports to allow for error or faults to be tracked and assessed to thereby allow corrective action to be initiated in a more timely manner.

30 Claims, 7 Drawing Sheets

U.S. PATENT DOCUMENTS

| | | | | |
|---|---|---|---|---|
| 6,124,947 | A * | 9/2000 | Seo | 358/405 |
| 6,359,974 | B1 * | 3/2002 | Ishibashi | 379/100.06 |
| 6,477,243 | B1 * | 11/2002 | Choksi et al. | 379/100.06 |
| 6,775,238 | B1 * | 8/2004 | Suzuki | 370/242 |
| 6,956,663 | B1 * | 10/2005 | Iida | 358/1.15 |
| 7,019,855 | B1 * | 3/2006 | Lee | 358/1.15 |
| 7,075,682 | B1 * | 7/2006 | Eguchi et al. | 358/434 |
| 7,142,320 | B2 * | 11/2006 | Tanimoto | 358/1.15 |
| 7,151,614 | B1 * | 12/2006 | Umansky et al. | 358/1.15 |
| 7,180,638 | B1 * | 2/2007 | Hou et al. | 358/439 |
| 2001/0002204 | A1 * | 5/2001 | Jebens et al. | 375/240.01 |
| 2004/0136021 | A1 * | 7/2004 | Martin et al. | 358/1.13 |
| 2006/0025964 | A1 * | 2/2006 | Iulo et al. | 702/182 |

FOREIGN PATENT DOCUMENTS

JP            10-224583      *   8/1998

OTHER PUBLICATIONS http://www.kana.com/about/about.aspx, Corporate Overview describing KANA icare Suite of prior art products and services, 2 sheets, © 2002.

http://www.kana.com/pdf/KANABrochure_FINAL.pdf, Kana Corporate Brochure, 5 sheets, © 2003, date of publication believed to be before Jun. 2003.

http://www.fenestrae.com/Products/Faxination_Server.asp, 1 sheet, date of publication and product available before Jun. 2003.

Pre-Patent Filing activity Declaration of Wealthy Desai, 2 sheets, dated Feb. 17, 2004.

* cited by examiner

The output of FaxTrack - as seen by customer service Rep

BAPNET > BAPCO E>tizing > Run Delivery Reject Report > Delivery Reject Report

Delivery Reject Report

> Your Account:
  Number XXX
  Employee: Name

📠 You may view a copy of this report

[log out]

🔍 View the Directory Advertising Order Terms & Conditions.

Delivery Reject Report — 142  144

Sales Office Code: F003 — 115  120 Entry Status: Open & Being Worked — 125

| Status | Type | Reject Timestamp | Customer ID | Customer Contact | Sales Rep | Sales Rep |
|---|---|---|---|---|---|---|
| Open ▽ | Order Conf | 00:00 05/22/03 | αN₁ | Fax: 561-XXXX | FN, LN (#) | Dial Tone Detected This package has already been resent 2 times. |
| Open ▽ | Order Conf | 00:00 05/26/03 | αN₂ | Fax: 561-XXXX | FN, LN (#) | Busy |

FIG. 4A

| | | | | | | |
|---|---|---|---|---|---|---|
| Open ▷ | Order Conf | 00:00 06/02/03 | αN₃ | Fax: 561-XXXX | FN, LN (#) | No Answer — 152 |
| Open ▷ | Order Conf | 00:00 05/13/03 | αN₄ | Fax: 561-XXXX | FN, LN (#) | Invalid Number This package has already been resent 3 times. — 153 |
| Open ▷ | Order Conf | 00:00 05/12/03 | αN₅ | Fax: | FN, LN (#) | No Fax Number — 154 |
| Open ▷ | Order Conf | 00:00 05/13/03 | αN₆ | Email: XXX@XXX | FN, LN (#) | Invalid Email This package has already been resent 3 times. — 155 |
| Open ▷ | Order Conf | 00:00 05/12/03 | αN₇ | Fax: 561-XXXX | FN, LN (#) | Invalid Number — 156 |
| Open ▷ | Order Conf | 00:00 05/13/03 | αN₈ | Fax: 561-XXXX | FN, LN (#) | Dial Tone Detected This package has already been sent 2 times. — 157 |
| Open ▽ | Order Conf | 00:00 | αN₉ | Fax: | FN, LN | Dial Tone — 158 |

AUTOMATED FACSIMILE MONITORING AND DISPLAYING METHODS AND RELATED SYSTEMS

FIELD OF THE INVENTION

This invention relates to data processing systems that can track facsimiles.

BACKGROUND OF THE INVENTION

Automated facsimile products, such as the FAXINATION® Server from Fenestrae Inc., located in Norcross, Ga., and KANA software systems from KANA Sofware Inc., located in Menlo Park, Calif., now allow for facsimiles to be generated and sent from desktops. Other automated products allow facsimiles to be stored in memory and sent from a one or more central facsimile stations. In any event, when an automated facsimile is sent to a destination or recipient site, such as a customer site, the transmission may be interrupted or otherwise unable to be successfully initiated or completed. In the past, the confirmation of a successful and/or failed transmission sent using automated facsimile products has been logged into a log file. The reason for the failure has been manually read from the log file. Unfortunately, this process can be tedious and difficult to monitor, particularly in high-volume (facsimile) traffic environments.

In view of the foregoing, there is a need for improved and/or automated facsimile monitoring systems that can allow more timely remedial action to be taken by appropriate personnel and/or support groups.

SUMMARY OF THE INVENTION

Embodiments of the present invention provide automated facsimile monitoring methods, systems, and computer program products that can track response data from multiple facsimiles sent to different locations to allow for error or faults to be tracked, assessed and, typically, corrected in a timely manner.

Certain embodiments are directed to methods of monitoring data associated with attempted automated transmission of facsimiles to target recipient sites. The methods can include: (a) obtaining facsimile status data regarding the failure of the recipient facsimile transmission at the sending site in response to the directing step; (b) generating an error or fault descriptor message that is descriptive of the likely transmission fault and/or problem based on the received facsimile data; (c) identifying the intended target recipient of the failed facsimile transmission; (d) providing an electronic database of a plurality of data fields, including a first data field for the error or fault descriptor message and a second data field for the intended recipient identity; (e) displaying a fault summary report that comprises data from the first and second data fields so that the fault summary report is electronically concurrently accessible by a plurality of users on a plurality of respective displays; and (f) repeating the obtaining, generating, identifying and providing steps for a plurality of separate target recipient facsimile transmissions.

Certain embodiments can include means for allowing customer service personnel to take corrective action such as to resend a facsimile, close a "bounced" fax, update the fax number, and the like.

In certain embodiments, the fault or error descriptors and other relevant information may be posted to a web page or site and/or relayed via a computer network such as an intranet and/or internet to an electronic address or site that can be accessed by customer or technical support personnel.

Other embodiments are directed to systems for monitoring data associated with the automated transmission of facsimiles to destination sites. The systems include: (a) means for obtaining electronic data regarding the failure of attempted, failed and/or incomplete facsimile transmissions at a sending site; (b) means for generating an error or fault descriptor message that is descriptive of the likely transmission fault and/or problem based on the received electronic data; (c) means for identifying the intended target recipient of respective failed facsimile transmissions; (d) means for providing an electronic database of a plurality of data fields for each failed transmission, including a first data field for the generated error or fault descriptor message and a second data field for the identity of the intended recipient; and (e) means for displaying a fault summary report that comprises data from the first and second data fields on a web page so that the fault summary report is electronically accessible by a plurality of users on a plurality of respective displays.

Again, in certain embodiments the systems can include means for allowing a customer service personnel to take corrective action such as to resend a facsimile, close a "bounced" fax, update the fax number, and the like.

The system may also include means for automatically directing facsimile transmissions that are sent from a plurality of desktops at a sending site to at least one facsimile portal and then to the respective target recipient sites.

Still other embodiments are directed to computer program products for monitoring data associated with the automated transmission of facsimiles to target or intended destination sites. The computer program product includes a computer usable storage medium having computer-readable program code embodied in the medium. The computer program product includes: (a) computer readable program code for receiving electronic data regarding the failure of attempted, failed and/or incomplete facsimile transmissions at a sending site; (b) computer program readable code for generating a general error or fault descriptor message that is descriptive of the likely transmission fault and/or problem based on the received electronic data; (c) computer readable program code for identifying the intended target recipient of respective failed facsimile transmissions; (d) computer readable program code for providing an electronic database of a plurality of data fields for each failed transmission, including a first data field for the generated error or fault descriptor message and a second data field for the identity of the intended recipient; and (e) computer readable program code for electronically displaying a fault summary report that comprises data from the first and second data fields on a web page so that the fault summary report is electronically accessible by a plurality of users on a plurality of respective displays.

The computer program product may include computer program code for automatically directing facsimile transmissions that are sent from a plurality of desktops at a sending site to at least one facsimile portal and then to the respective target recipient sites.

Other embodiments are directed to systems for monitoring facsimiles having failed or incomplete facsimile transmissions to destination sites, and include: (a) an application server proximate a facsimile portal at a sending site, configured to transmit facsimiles to target recipient sites and to receive electronic data regarding the failure of attempted, failed and/or incomplete facsimile transmissions at the sending site; (b) computer program code for generating an error or fault descriptor message that is descriptive of the likely transmission fault and/or problem based on the received electronic data associated with the failed transmission; (c) computer program code for identifying the intended target recipient of respective failed facsimile transmissions; (d) computer program code for providing an electronic database of a plurality of data fields for a failed transmission, including a first data field for the generated error or fault descriptor message and a second data field for the identity of the intended recipient; (e) computer program code for generating a fault summary report that comprises data from the first and second data fields; and (f) a processor in communication with the server and being operatively associated with computer program code that presents the fault summary report to a web page so that the fault summary report is electronically accessible by a plurality of users on a plurality of respective displays.

It is noted, that features of embodiments of the invention as described herein may be methods, systems, computer programs or a combination of same although not specifically stated as such. The above and other embodiments will be described further below.

DETAILED DESCRIPTION

The present invention will now be described more fully hereinafter with reference to the accompanying figures, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. In the drawings, layers, regions, or components may be exaggerated for clarity. In the figures, broken lines indicate optional features unless described otherwise. The method steps are not limited to the order in which they are set forth.

The term "facsimile transmission" may be used interchangeably herein with the word "fax." The terms "failed" "failure" fail" and the like when describing a facsimile transmission includes the unsuccessful delivery of a facsimile transmission whether in-whole or in-part (i.e., partially complete) or other fault associated with the attempted, partial, or total transmission (i e., misdirected, delayed, illegible). The term "general error or fault descriptor message" means a message that generally describes or summarizes the likely, prevalent error or fault in a non-technical manner so that non-computer technicians can understand the reason for the failed transmission. The term "high-volume" means a business or office environment that generally transmits over about 20 facsimiles per shift, typically over 50 per shift, which may produce about 5-10 (or more) failed transmissions per shift (or day).

A portion of the disclosure of this patent document contains material, which is subject to copyright protection. The copyright owner, BellSouth Intellectual Property Corporation, of Atlanta, Ga., has no objection to the reproduction or copying by anyone of the patent document or the patent disclosure, as it appears in the Patent and Trademark Office patent file or records, but otherwise reserves all rights whatsoever.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Figure 1:
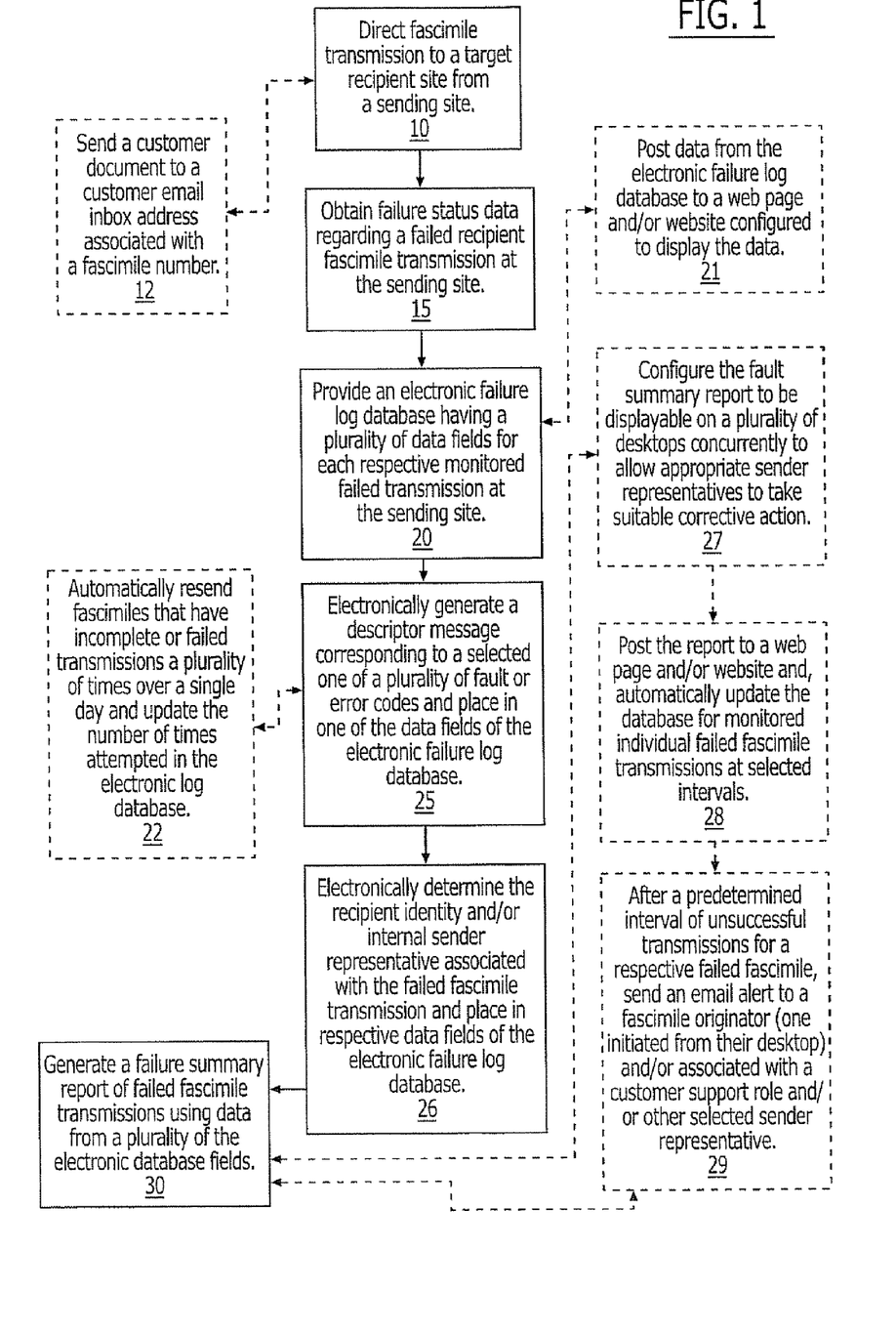
FIG. 1 is a flow diagram of operations that may be carried out according to embodiments of the present invention.

Referring now to FIG. 1, examples of operations that can be used to carry out embodiments of the present invention are illustrated. A facsimile transmission is directed to a target recipient (destination) site from a sending site (block 10). The facsimile transmission may, in certain particular embodiments, be initiated from a desktop using either a target recipient (customer destination) email address or facsimile number (block 12) and attaching a document desiring to be faxed.

Status data regarding a failed transmission can be obtained (block 15). The status data may include a numeric fault code and/or brief "technical" text identifier script associated with the reason for the failed transmission as has been conventionally provided by the FAXINATION® product as will be discussed further below. The failure status data may be generated automatically in response to the attempted facsimile transmission and forwarded to the facsimile portal server and on to a selected electronic address (such as a defined email address for the success and failure log of automated facsimiles).

An electronic failure log database having a plurality of data fields is provided and is configured to accept data regarding respective failed transmissions (block 20). The database may be updated at desired intervals (such as at each shift, daily, hourly and the like) or substantially continuously (such as every 5-10 minutes) during certain monitoring intervals (such as when personnel are available to attend to corrective actions for the failed transmissions). The update interval can be adjusted depending on the number of failures detected or during high volume periods.

Data from the electronic failure log database can be posted to a web page or web site that is configured to display data from the electronic failure log database (block 21).

Fault or error descriptor messages can be generated and input as one of the data fields in the electronic failure log database (block 25). The fault or error descriptor messages can be "general messages" in a predetermined electronically selectable list of corresponding alphanumeric fault codes assigned to the failed transmission. The assigned fault code can be based on the facsimile failure data. The general messages are directed to general users or lay-persons (such as customer service representatives not computer technicians) and are presented in language that a non-computer technician can understand. That is, the error message is stated in a general brief summary that acts as a contemporaneous guide to the underlying problem and is more easily understood than failure codes and text used in conventional systems. The error or fault descriptor message can be electronically selected or assigned based on a predetermined list of computer-selectable "general" messages that matches a fault code defined based on the failure status data. For certain of the transmissions corresponding to predetermined ones of the general error fault codes, the facsimiles can be resent a plurality of times over a single day and the data filed for the error message (or a separate data field in the electronic database) can indicate the number of times attempted (block 22).

Similarly, the (intended) recipient and/or sender representative (such as the fax originator, or client or customer support representative) can be identified and this information entered as a field(s) in the electronic failure log database (block 26). The identity of the (intended) recipient can be determined based on the facsimile or email address used to forward the facsimile order. The sender representative can be defined (name or other identifier such as particular sales or sender group) based on a look up table of client or customer responsibility. In certain embodiments, the sender representative can be the fax originator that can be identified electronically using the email address that initiated the fax order.

A failure summary report can be generated (block 30) that includes data from a plurality of the data fields in the electronic failure log database. The report can be electronically generated and configured to be displayed concurrently from a plurality of respective displays (such as at each customer service station, desktops, laptops, and/or pervasive and/or portable communications device) (block 27) to allow appropriate or interested individuals to take appropriate corrective action. The report is typically posted to and/or displayed by a web page or site that can be accessed by all or selected personnel and automatically updated at desired intervals (block 28). The updates may be carried out to update selected fields for past failed transmissions and/or to add data for new failures. The report or the relevant segment thereof may also be emailed as a document to the individual determined to be the representative (or fax originator).

In certain particular embodiments, after a predetermined interval of unsuccessful transmissions and/or other defined conditions, an email alert can be automatically generated and forwarded to a facsimile originator and/or a support representative (block 29) to facilitate timely corrective or remedial actions. As such, the electronic database may include or communicate with an electronic database of email addresses for the representatives associated with the failed transmissions.

Figure 2:
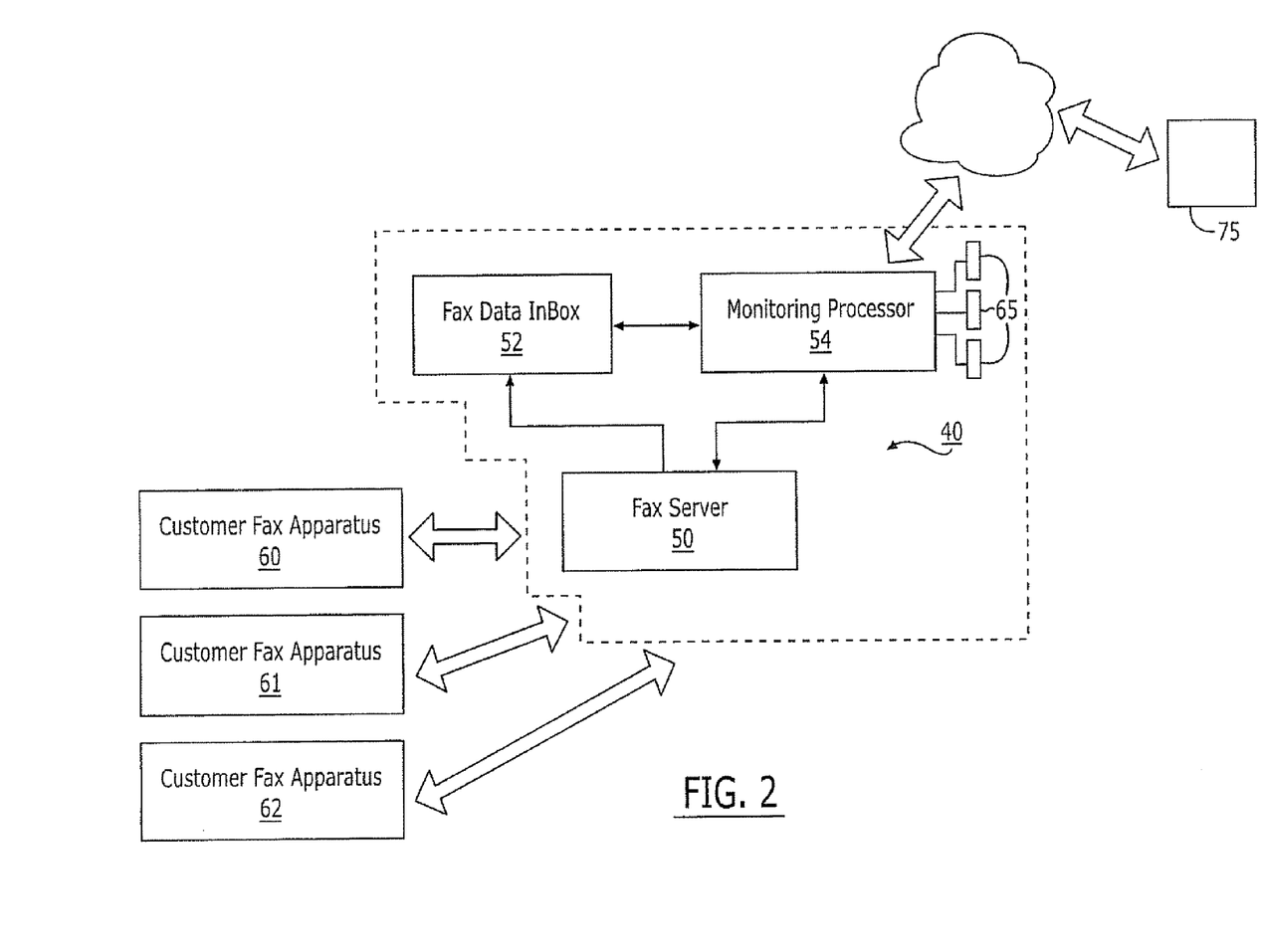
FIG. 2 is a schematic illustration of a system for tracking facsimile data associated with the success or failure of facsimile transmissions according to embodiments of the present invention.

FIG. 2 is a schematic illustration of an exemplary fax failure monitoring or tracking system 40 according to embodiments of the present invention. As shown, an application server 50 is in communication with a monitoring processor 54. The processor 54 and the server 50 are operatively associated with an incoming fax data electronic inbox 52 that obtains the initial data regarding a failed facsimile transmission. The inbox 52 may be held in the server 50, in the processor 54, or at a different suitable electronic address. The processor 54 and the server 50 can be located at the sender site (indicated by the broken line box encompassing same in the figure). The server 50 is configured to transmit the faxes to different target destinations, shown as a plurality of different target customer fax apparatus 60, 61, 62. The server 50 can operate as the fax portal for transmitting the faxes from the sender site. The processor 54 can be configured to provide the failure summary report and/or data from the electronic failure database to a plurality of displays 65. The displays 65 can be associated with desktop computers or other computing or communication (web based) devices. The displays 65 may be connected to the monitoring processor 54 via a computer network.

In operation, in certain embodiments, a failed fax transmission occurs. The failure is detected and the server 50 can obtain data regarding the success or failure thereof. The server 50 can forward the failure data to an email address associated with the fax data inbox 52. The processor 54 can obtain the failure data and communicate with the server 50 to determine the intended recipient to automatically obtain and input the data into respective data fields in the electronic failure log database.

Figure 3A:
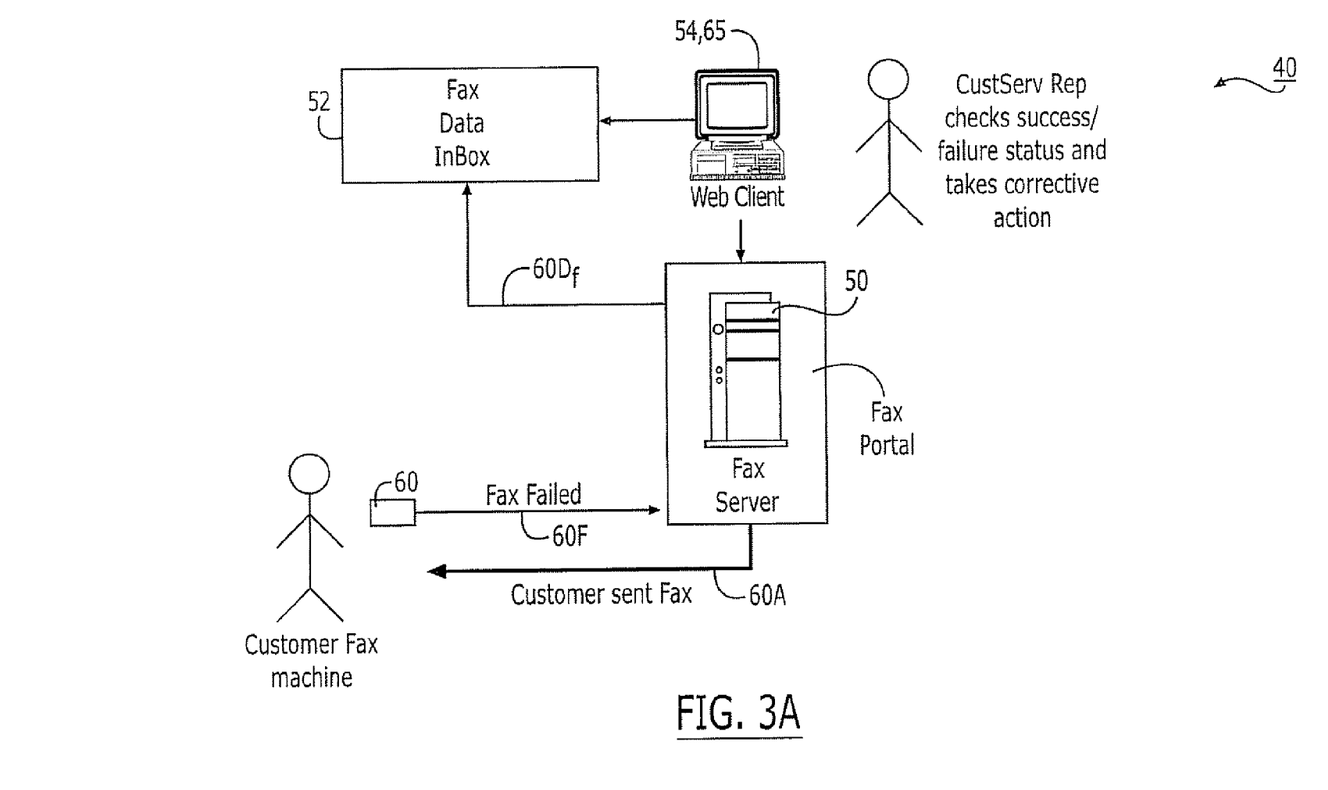
FIG. 3A is a schematic illustration of an exemplary system to provide an automated facsimile status database with a displayable report according to embodiments of the present invention.

Although shown in FIGS. 2 and 3A as one server 50, the system 40 may include a plurality of servers 50 which may act independently or in cooperation with a main director server to streamline outgoing and incoming faxes and messages. For example, three fax servers 50 can be associated with a single inbox. In certain embodiments, if two or more fax servers 50 are employed, an additional fax data inbox may be used (or a single, common inbox may be used) and separate failure log databases and failure summary reports can be generated based on the particular server used. However, in certain embodiments, even where a plurality of fax servers are used, the electronic failure database log can be shared and include data from all failed outgoing facsimiles, irrespective of the portal or server used. In this embodiment, a separate data field may be used to identify the outgoing server or fax portal.

As shown, the processor 54 may be configured to communicate with pervasive computer devices and/or portable communication devices 75. That is the failure summary report may be downloadable (printable or displayable) via a local or global computer network, such as an Intranet and/or the Internet, to allow field service or remote personnel to access the failure summary report.

The pervasive computing and/or communication devices 75 can be a personal computer whether a palm, laptop or vehicle-integrated computer and the like. Alternatively, the pervasive computing device may be a smartphone, a two-way wireless communicator (such as the BLACKBERRY™ wireless platform) or PDA.

The computer network can be a local area network, a wide area network or a direct connection and may include an intranet (computers connected within a particular organization, company, coalition, or group), an extranet, a Virtual Private Network (VPN), a global computer network such as the Internet, including the World Wide Web, or other such mechanism for allowing a plurality of data processing systems with respective output displays 65, 75 to communicate.

The communication link to the computer network is illustrative of various suitable communications mechanisms that allow a processor to communicate over a computer network. Such a communications link may be provided, for example, by a network interface of a data processing system in communication with the processor 54 and/or web client 40w. Typical network interfaces may include Ethernet, Token Ring or other such direct connections to a computer network provided, typically by network interface card (NICs) or may be provided by, for example, a modem, including cable modems, Digital Subscriber Loop (DSL) modems, including ADSL an sDSL modems, wireless modems or conventional telephone modems which provides communications to a computer network.

In certain embodiments, the processor 54 can provide information about the status of failed transmissions in a report as web pages that may be predefined and stored at a local device. Such web pages may also be dynamically generated to incorporate substantially real-time data or updated at desired intervals. The web pages may be Hyper-text Markup Language (HTML) common gateway interface (CGI) web pages. The web pages may also be or include Java scripts, Java applets or the like which may execute at the processor 54. As will be appreciated by those of skill in the art, other mechanisms for communicating between a web server and a client may also be utilized. For example, other markup languages, such as Wireless Markup Language (WML) or the like, for communicating between the local processor and a prospective user can be used.

FIG. 3A is a schematic illustration of an embodiment of the present invention. An application server 50, such as a FAXINATION® server from Fenestrae Inc., can be used to communicate with the customer or recipient facsimile apparatus 60. A procesor 54 can be used to communicate with a suitable electronic exchange interface mailbox, such those available from KANA, MICROSOFT® EXCHANGE, LOTUS® NOTES, and similar products. The procesor 54 is shown as being in communication with a Web client. The web server/client can be a desktop server and may be integrated with the monitoring processor/server 54 or configured as a separate server.

The system 40 can include a Web server (sometimes also referred to as a Hyper-Text Transfer Protocol (HTTP) server) which comprises a computer program that utilizes HTTP to serve files that form Web pages to Web clients. Exemplary Web servers are International Business Machines Corporation's family of LOTUS DOMINO® servers, the APACHE server (available from apache.org), Microsoft's Internet Information Server (IIS), available from Microsoft Corporation, Redmond, Wash., and IPLANET from SUN MICROSYSTEMS.

Figure 3B:
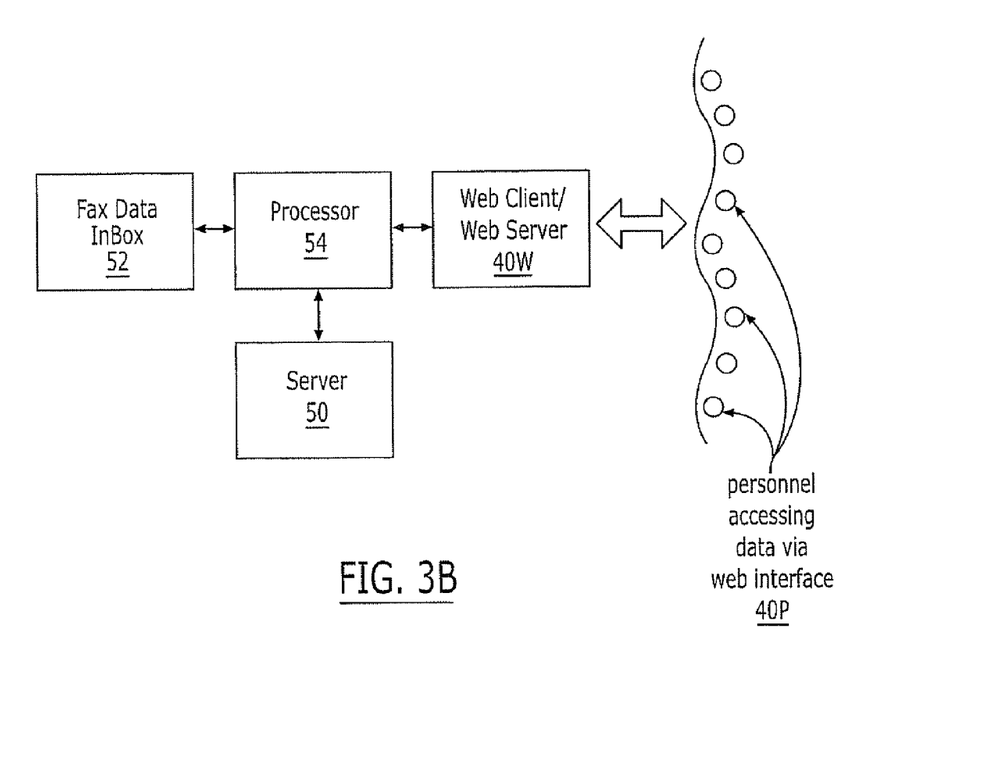
FIG. 3B is a schematic illustration of another exemplary system according to embodiments of the present invention.

FIG. 3B illustrates another exemplary system 40. In this embodiment the KANA component is operatively associated with processor 54 and processor 54 is operatively associated with fax server 50. The server 54 is also operatively associated with a web client/web server 40w that provides the fax data report to personnel 40p accessing the data via the web interface.

An attempted transmission 60A occurs and if successful, confirmation of the fax is sent back to the "sending email address inbox." If the fax fails, data regarding the failure 60F is emailed back to the "sending email address inbox" which can then be stored in a response database. Embodiments of the present invention then can interrogate the response email database of success and failure data and excerpt the failure data associated with failed transmissions. The system 40 can be configured to provide the failure summary report to a web page and sender personnel or users can access the report to take corrective action as appropriate. For example, the representative can correct the fax number of the recipient and instruct the system 40 to resend the fax to the correct number or the program itself and/or representative can mark or instruct the system to stop attempting to resend the failed facsimile transmission.

Embodiments of the present invention include operations that review the failure data and then assign or select one of a predetermined number of general message codes to the failure. The electronic failure log database includes a data field that corresponds to a general fault or error descriptor message chosen based on the respective fault code that can be obtained based on an electronic look-up table or reference library. An example of a general message code and corresponding general descriptor fault messages (user friendly messages which can be displayed) is provided as Table 1 below.

TABLE 1

GENERAL FAULT OR ERROR MESSAGES AND CODES

| MESSAGE CODE NO. | GENERAL DESCRIPTOR MESSAGE |
|---|---|
| GeneralMessage.1 = | Attachment Failure - Resend |
| GeneralMessage.2 = | Busy |
| GeneralMessage.3 = | Dial Tone Detected |
| GeneralMessage.4 = | Invalid Number |
| GeneralMessage.5 = | Busy |
| GeneralMessage.6 = | No Answer |
| GeneralMessage.7 = | Possible Dead Line |
| GeneralMessage.8 = | Busy |
| GeneralMessage.9 = | Attachment Failure - Resend |

The electronic log database can include a plurality of selected data fields that provide sufficient information to allow a customer service representative or other personnel to take corrective action or monitor the status of the failed fax remotely. Table 2 illustrates several data base fields that can be used according to embodiments of the present invention. The fields may be altered based on the actual application and additional or lesser numbers of fields may be used.

TABLE 2

FAX FAILURE SUMMARY LOG
ELECTRONIC DATABASE FIELDS

| Database Field Header | Database Field Data |
| --- | --- |
| CUSTID | Customer Identification Number |
| SALESOFFICECODE | SalesOffice the customer belongs to |
| ERRORMESSAGE | Error message indicating the failure of Fax |
| STATUS | Open/Being worked/Mailed; Action the customer service rep takes |
| TIMESTAMP | Date/Time when the Fax delivery failed |
| SALESREPNBR | Sales rep who's customer account this is |

Figure 4:
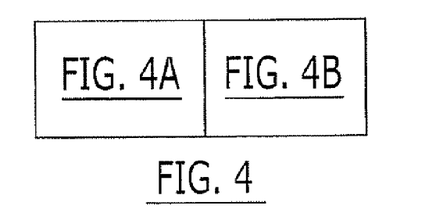
FIG. 4 is a partially redacted screen printout of a delivery reject report according to embodiments of the present invention.
Figure 4A:
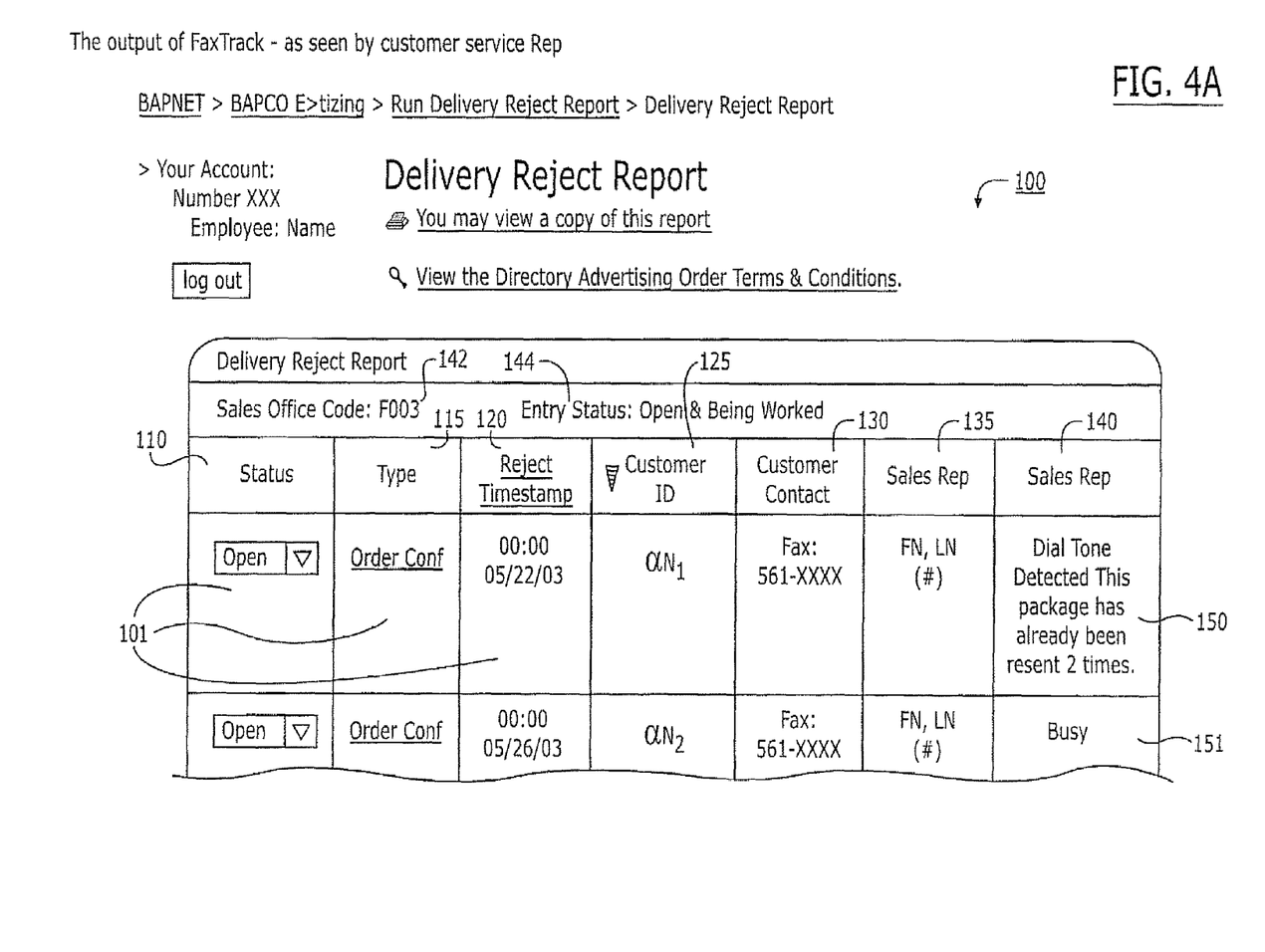
Figure 4B:
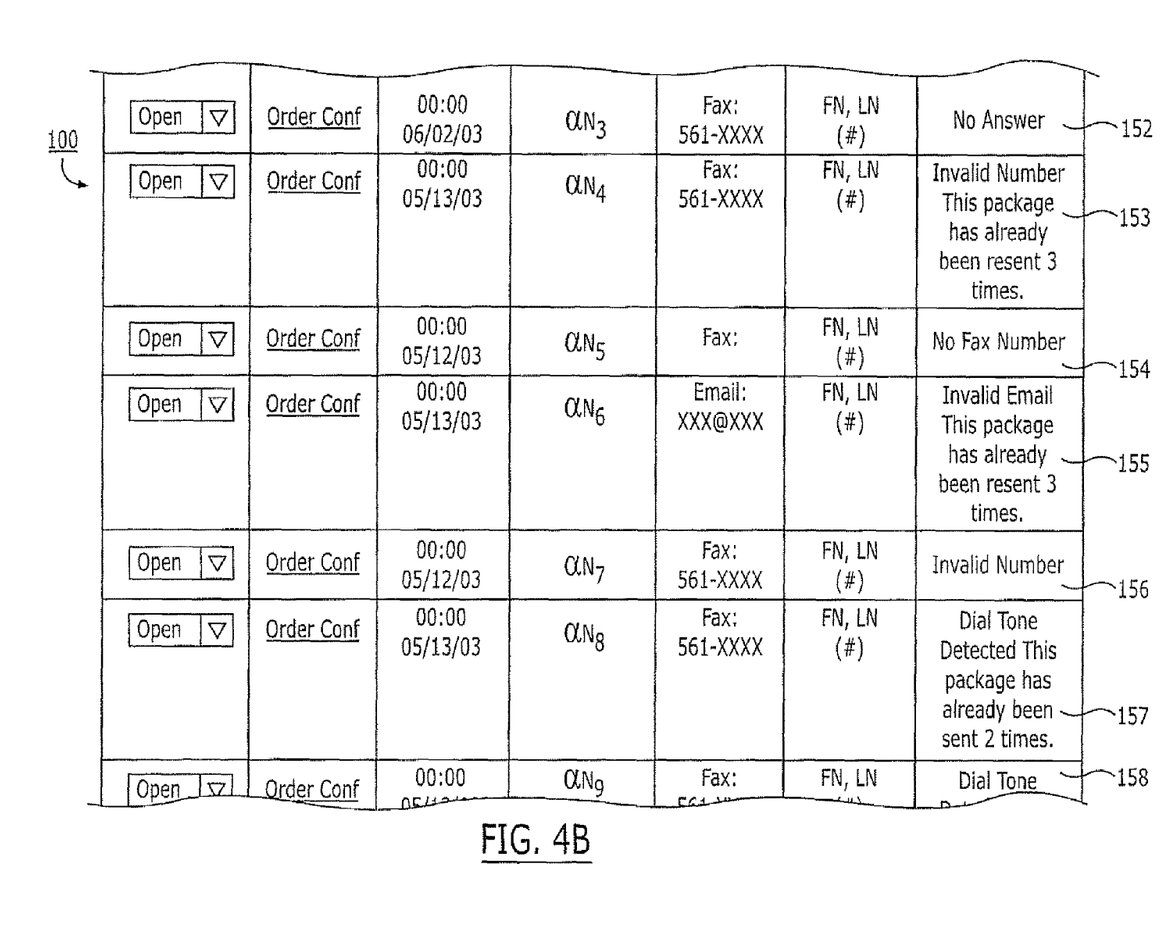

FIG. 4 is a screen print out of a failure summary report 100 (titled a "Delivery Reject Report") with records 150-158 and associated data fields 101 displayed according to embodiments of the present invention. The report 100 can accommodate as many records as needed to indicate the status of failed transmissions (on a 30 day period, the report may include many records in various states (and ages) of investigation or corrective action).

As shown in FIG. 4, the report 100 includes a status field 110 which may be configured with a pull down menu of selectable choices (shown as open, but can include other actions, such as closed, mailed, resent, and others such as those shown in Table 2 under the STATUS field header). The report 100 can also include a data field 115 type of document that was sent (shown as order confirmations but may be other documents such as payment confirmations or other suitable document type). The report as shown also includes a reject timestamp field 120 and a customer ID field 125. The customer ID field 125 may display an alphanumeric client and/or a customer company serial number (such as a 12 digit number as indicated by the symbol "$\alpha N^1$-$\alpha N^9$" in FIG. 4). The report 100 also can include a customer contact data field 130 that may include a fax number and/or email address (and may optionally include a contact name). The report 100 may further include a personnel (shown as sales) representative field 135. Each record in this field 135 may include a first "FN" and last name "LN" or other employee indicia and/or employee ID number (Emp. No. or "#") and/or telephone number and/or email address. The individual listed in this field 135 may have responsibility for monitoring and following-up on a failed transmission identified with their name. The last data field shown is the error message descriptor field 140 that displays the general fault or error message as noted above.

The report 100 may also be divided and/or electronically sortable by an office location or department field 142 (shown as a sales office having a unique sales office code). The report 100 may include a header with an entry status field 144.

In certain embodiments, the report 100 may be output or displayed to particular users based on what sender representative (such as a customer service representative) accesses the report database. For example, a first representative can type in their assigned account access identifier (name, password, email or whatever suitable identifier is used) and that identifier can be used to run a customized report that lists only those faxes that that person is responsible for (sorted or defined by client, sales representative, region of the country, or however the responsibility is determined in a particular situation). A manager may be given global or increased access with customized ability to run reports sorted by representative or department and the like to monitor the response for each representative and/or department. In other embodiments, each representative can view the entire record of delivery rejects (fax faults).

Figure 5:
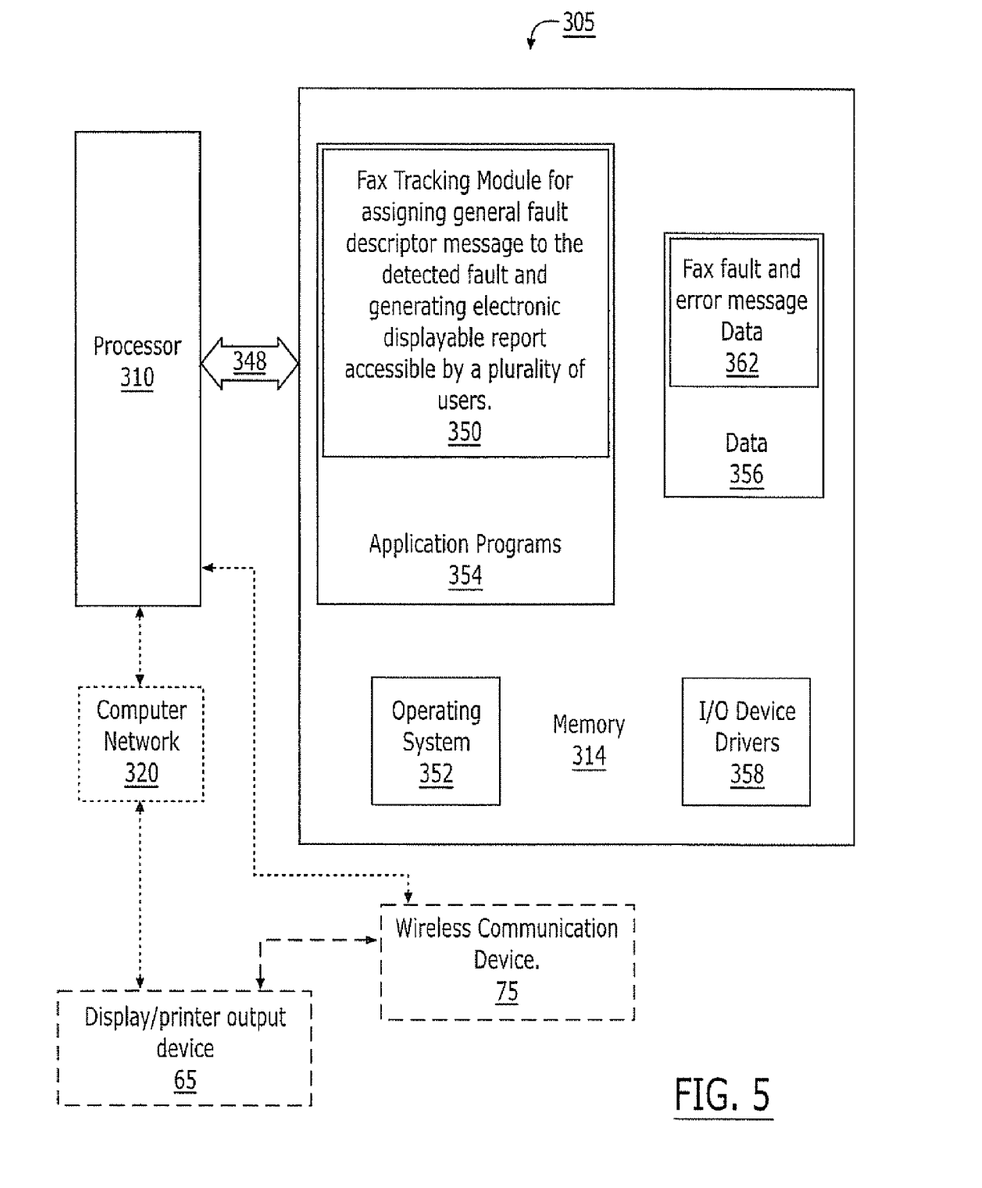
FIG. 5 is a schematic illustration of an operating system according to embodiments of the present invention.

FIG. 5 is a block diagram of exemplary embodiments of data processing systems that illustrates systems, methods, and/or computer program products in accordance with embodiments of the present invention. The processor 310 30 communicates with the memory 314 via an address/data bus 348. The processor 310 can be any commercially available or custom microprocessor. The memory 314 is representative of the overall hierarchy of memory devices containing the software and data used to implement the functionality of the data processing system 305. The memory 314 can include, but is not limited to, the following types of devices: cache, ROM, PROM, EPROM, EEPROM, flash memory, SRAM, and DRAM.

As shown in FIG. 5, the memory 314 may include several categories of software and data used in the data processing system 305: the operating system 352; the application programs 354; the input/output (I/O) device drivers 358; an automated Fax Tracking Module for assigning one of a plurality of general error or fault descriptor messages to the detected failed transmission and generating an electronic displayable report that is accessible by a plurality of users 350; and data 356.

The data 356 may failure and success data of all transmitted faxes 362 may be obtained directly from a conventional automated fax system. As will be appreciated by those of skill in the art, the operating system 352 may be any operating system suitable for use with a data processing system, such as OS/2™, AIX™ or OS/390™ from International Business Machines Corporation, Armonk, N.Y., WINDOWSXP™, WINDOWSCE™, WINDOWSNT™, WINDOWS95™, WINDOWS98™ OR WINDOWS2000™ from Microsoft Corporation, Redmond, Wash., PALM OS™ from Palm, Inc., MAC OS™ from Apple Computer, UNIX™, FREEBSD™, LINUX™, proprietary operating systems or dedicated operating systems, for example, for embedded data processing systems.

The I/O device drivers 358 typically include software routines accessed through the operating system 352 by the application programs 354 to communicate with devices such as I/O data port(s), data storage 356 and certain memory 314 components and/or the image acquisition system 320. The application programs 354 are illustrative of the programs that implement the various features of the data processing system 305 and preferably include at least one application that supports operations according to embodiments of the present invention. Finally, the data 356 represents the static and dynamic data used by the application programs 354, the operating system 352, the I/O device drivers 358, and other software programs that may reside in the memory 314.

While the present invention is illustrated, for example, with reference to the Fax Track Module 350 being an application program in FIG. 5, as will be appreciated by those of skill in the art, other configurations may also be utilized while still benefiting from the teachings of the present invention. For example, the Module 350 may also be incorporated into the operating system 352, the I/O device drivers 358 or other such logical division of the data processing system 305. Thus, the present invention should not be construed as limited to the configuration of FIG. 5, which is intended to encompass any configuration capable of carrying out the operations described herein.

The I/O data port can be used to transfer information between the data processing system 305 and the computer network 320 (e.g., the Intranet or Internet) or another computer system or other device controlled by the processor. These components may be conventional components such as those used in many conventional data processing systems, which may be configured in accordance with the present invention to operate as described herein.

The present invention is explained further below with the following non-limiting Examples, in which numerous error messages or codes associated with a conventional failed transmission are recoded to a reduced general failure message (based on an assigned one of the 1-9 general fault codes listed in Table 1).

EXAMPLE 1

The below list of error messages or codes, the portions of which that are shown in parentheses and/or preceeding the "=" sign, have been generated by a FAXINATION® product and the code after the "=" sign corresponds to the assigned general error or fault descriptor message fault code (shown as nos. 1-9) used to generate the "user friendly messages" according to embodiments of the present invention. For example, with respect to the first line below, error code zero and the "unsupported" text is assigned general message descriptor "1" for the report 100. It is noted that the general fault code after the "=" sign can be reconfigured or redefined as appropriate (such as where the text field preceeding the sign changes and/or a more appropriate general error message may be desired or indicated).

```
Unsupported_attachment_filetype_detected!_(0)=1
Reorder_or_fast_busy;_indicates_that_telephone_company_trunk_lines_are_busy;_
on_PBX's_indicates_no_available_outside_lines._(-1)=2
Dial_tone_detected;_usually_indicates_the_dialing_sequence_did_not_break_dial_
tone._(-1)=3
Vacant_tone_detected;_remote_originating_failure;_invalid_telephone_number;_
(-1)=4
Busy_tone_detected;_remote_end_busy_(off-hook)_(-1)=5
The_remote_end_was_ringing_but_did_not_answer._(-1)=6
After_dialing_the_number,_no_energy_detected_on_the_line_for_the_wait_for_ced_
time-out_period;_possible_dead_line._(-1)=7
Answer_(probably_human)_detected;_does_not_match_any_other_expected_call_
progress_signal_patterns._(-1)=8
Attachment_file_does_not_exist=9
NCPI_not_supported_by_current_protocol,_NCPI_ignored_(-1)=2
Flags_not_supported_by_current_protocol,_flags_ignored_(-1)=2
Alert_already_sent_by_another_application_(-1)=2
Too_many_applications_(-1)=2
Logical_block_size_to_small,_must_be_at_least_128_Bytes_(-1)=2
Buffer_exceeds_64_kByte_(-1)=2
Message_buffer_size_too_small,_must_be_at_least_1024_Bytes_(-1)=2
Max._number_of_logical_connections_not_supported_(-1)=2
Reserved_(-1)=3
The_message_could_not_be_accepted_because_of_an_internal_busy_condition_
(-1)=2
OS_resource_error_(no_memory_?)_(-1)=2
CAPI_not_installed_(-1)=2
Controller_does_not_support_external_equipment_(-1)=2
Controller_does_only_support_external_equipment_(-1)=2
Illegal_application_number_(-1)=4
Illegal_command_or_subcommand_or_message_length_less_than_12_bytes_(-1)=4
The_message_could_not_be_accepted_because_of_a_queue_full_condition_!!_(-1)=2
Queue_is_empty_(-1)=2
Queue_overflow,_a_message_was_lost_!!_This_indicates_a_configuration_error._
(-1)=2
Unknown_notification_parameter_(-1)=2
The_Message_could_not_be_accepted_because_of_an_internal_busy_condition_(-1)=2
OS_Resource_error_(no_memory_?)_(-1)=6
CAPI_not_installed_(-1)=2
Controller_does_not_support_external_equipment_(-1)=2
Controller_does_only_support_external_equipment_(-1)=2
Message_not_supported_in_current_state_(-1)=2
Illegal_Controller_/_PLCI_/_NCCI_(-1)=2
Out_of_PLCI_(-1)=7
Out_of_NCCI_(-1)=7
Out_of_LISTEN_(-1)=7
Out_of_FAX_resources_(protocol_T.30)_(-1)=7
Illegal_message_parameter_coding_(-1)=7
B1_protocol_not_supported_(-1)=7
B2_protocol_not_supported_(-1)=7
B3_protocol_not_supported_(-1)=7
B1_protocol_parameter_not_supported_(-1)=7
B2_protocol_parameter_not_supported_(-1)=7
B3_protocol_parameter_not_supported_(-1)=7
B_protocol_combination_not_supported_(-1)=7
NCPI_not_supported_(-1)=7
CIP_Value_unknown_(-1)=7
Flags_not_supported_(reserved_bits)_(-1)=7
```

-continued

Facility_not_supported_(−1)=7
Data_length_not_supported_by_current_protocol_(−1)=7
Reset_procedure_not_supported_by_current_protocol_(−1)=7
Protocol_error_layer_1_(broken_line_or_B-channel_removed_by_signalling_protocol)_(−1)=7
Protocol_error_layer_2_(−1)=7
Protocol_error_layer_3_(−1)=7
Another_application_got_that_call_(−1)=3
Connecting_not_successful_(remote_station_is_no_FAX_G3_machine)_(−1)=6
Connecting_not_successful_(training_error)_(−1)=6
Disconnected_before_transfer_(remote_station_does_not_support_transfer_mode_(−1)=6
Disconnected_during_transfer_(remote_abort)_(−1)=6
Disconnected_during_transfer_(remote_procedure_error,_e.g._unsuccessful_(−1)=6
Disconnected_during_transfer_(local_tx_data_underrun)_(−1)=6
Disconnected_during_transfer_(local_rx_data_overflow)_(−1)=6
Disconnected_during_transfer_(local_abort)_(−1)=6
Illegal_parameter_coding_(e.g._SFF_coding_error)_(−1)=6
The_Message_could_not_be_accepted_because_of_an_internal_busy_condition_(−1)=3
Unallocated_(unassigned)_number_(−1)=6
No_route_to_specified_transit_network_(−1)=6
No_route_to_destination_(−1)=6
Channel_unacceptable_(−1)=6
Call_awarded_and_being_delivered_in_an_established_channel_(−1)=3
Normal_call_clearing_(−1)=3
User_busy_(−1)=2
No_user_responding_(−1)=6
No_answer_from_user_(user_alerted)_(−1)=6
Call_rejected_(−1)=6
Number_changed_(−1)=4
Non-selected_user_clearing_(−1)=3
Destination_out_of_order_(−1)=3
Invalid_number_format_(−1)=4
Facility_rejected_(−1)=7
Response_to_STATUS_ENQUIRY_(−1)=3
Normal,_unspecified_(−1)=3
No_circuit_/_channel_available_(−1)=2
Network_out_of_order_(−1)=7
Temporary_failure_(−1)=3
Switching_equipment_congestion_(−1)=2
Access_information_discarded_(−1)=7
Requested_circuit_/_channel_not_available_(−1)=7
Resources_unavailable,_unspecified_(−1)=7
Quality_of_service_unavailable_(−1)=7
Requested_facility_not_subscribed_(−1)=7
Bearer_capability_not_authorized_(−1)=7
Bearer_capability_not_presently_available_(−1)=7
Service_or_option_not_available,_unspecified_(−1)=7
Bearer_capability_not_implemented_(−1)=7
Channel_type_not_implemented_(−1)=7
Requested_facility_not_implemented_(−1)=7
Only_restricted_digital_information_bearer_capability_is_available_(−1)=7
Service_or_option_not_implemented,_unspecified_(−1)=7
Invalid_call_reference_value_(−1)=7
Identified_channel_does_not_exist_(−1)=7
A_suspended_call_exists,_but_this_call_identity_does_not_(−1)=7
Call_identity_in_use_(−1)=7
No_call_suspended_(−1)=7
Call_having_the_requested_call_identity_has_been_cleared_(−1)=7
Incompatible_destination_(−1)=7
Invalid_transit_network_selection_(−1)=7
Invalid_message,_unspecified_(−1)=7
Mandatory_information_element_is_missing_(−1)=7
Message_type_non-existent_or_not_implemented_(−1)=7
Message_not_compatible_with_call_state_or_message_type_non-existent_or_not (−1)=7
Information_element_non-existent_or_not_implemented_(−1)=7
Invalid_information_element_contents_(−1)=7
Message_not_compatible_with_call_state_(−1)=7
Recovery_on_timer_expiry_(−1)=7
Protocol_error,_unspecified_(−1)=7
Interworking,_unspecified_(−1)=7

Thus, embodiments of the present invention provide a reference library of predetermined general fault or error descriptor messages associated with respective defined general fault codes. The facsimile status data obtained from the failed faxes includes second fault codes (shown as two different numeric codes (−1 or 0, typically using only one numeric code "1") and may include numerous different textual data appended thereto. The second fault codes and many different appended text portions that may be suitable for technical audiences, are different from the general fault codes and general messages as described above. Thus, operations of the present invention, compare the received data (which may be digital bits or code in the subject line of an email received in response to the transmission) and interpret the received data to define which one of the general fault codes in the predefined library of general fault codes applies, then assign one of the predetermined general fault codes to the failed transmission which is then used to generate at least a portion of the associated fault descriptor message for the report. As shown, the received facsimile data can include a lesser number of numeric fault codes (−1, 0) versus (for example, 1-9) and a greater number of textual comments associated with the second fault code (−1, 0) relative to the number of general fault codes (9) and respective descriptor messages in the library of predetermined messages.

In the drawings and specification, there have been disclosed embodiments of the invention and, although specific terms are employed, they are used in a generic and descriptive sense only and not for purposes of limitation, the scope of the invention being set forth in the following claims. The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A method of monitoring data associated with attempted automated transmission of facsimiles to target recipient sites, comprising:
   obtaining facsimile status data regarding the failure of a facsimile transmission that is directed from a sending site to a recipient site;
   generating an error or fault descriptor message that is descriptive of the likely transmission fault and/or problem based on the obtained facsimile data;
   identifying the intended target recipient of the failed facsimile transmission;
   providing an electronic database of a plurality of data fields, including a first data field for the error or fault descriptor message and a second data field for the intended recipient identity;
   displaying a fault summary report that comprises data from the first and second data fields so that the fault summary report is electronically concurrently accessible by a plurality of users on a plurality of respective displays;
   repeating the obtaining, generating, identifying and providing steps for a plurality of separate target recipient facsimile transmissions; and further comprising:
   providing a reference library of predetermined fault or error descriptor messages associated with respective defined general fault codes, and wherein the obtained facsimile status data includes second fault codes different from the general fault codes and may include textual data, and wherein the generating step comprises assigning one of the predetermined general fault codes to the obtained facsimile status data to generate at least a portion of the associated fault descriptor message for the report.

2. A method according to claim 1, wherein the displaying step comprises presenting the fault summary report on a web page.

3. A Method according to claim 2, wherein the providing and displaying steps are carried out using an intranet.

4. A method according to claim 1, further comprising automatically generating the fault summary report at least daily.

5. A method according to claim 1, wherein the fault summary report includes data from a third data field that corresponds to the identity of a sender representative responsible for the identified recipient and/or a facsimile originator.

6. A method according to claim 2, further comprising allowing sender personnel to electronically access the web page to monitor the problem with the failed facsimile transmission based on the error or fault descriptor message.

7. A method according to claim 1, wherein the received facsimile data includes one of a lesser number of second fault codes and one of a greater number of textual comments associated with the second fault code relative to the number of general fault codes and respective messages in the library of predetermined messages.

8. A method according to claim 1, wherein the fault or error descriptor message includes the number of times the facsimile has been unsuccessfully attempted.

9. A method according to claim 1, wherein the library includes nine general fault codes which correspond to a respective one of nine different general error or fault descriptor messages.

10. A method according to claim 1, wherein the electronic database includes a data field for a contact number associated with the identified target recipient, and wherein the fault summary report includes the contact number.

11. A method according to claim 9, wherein the electronic database includes a data field for a time stamp associated with the date and/or time when the attempted facsimile transmission failed, and wherein the fault summary report includes the time stamp data.

12. A method according to claim 1, wherein the electronic database includes data fields for: (a) the code or identity of an office associated with an account of the identified sender; (b) a customer recipient identification number; (c) the action status taken by sender personnel for the failed facsimile; (d) a time stamp associated with when the failed facsimile occurred; and (e) the sender representative associated with the failed facsimile and/or intended recipient.

13. A method according to claim 1, further comprising forwarding an email message to the identified sender representative and/or facsimile originator at a predetermined interval after the failed facsimile is detected to automatically notify them of the failed transmission.

14. A method according to claim 1, directing the facsimile transmission from a sending site to a target recipient site by electronically generating an email instruction to facsimile a document at a desktop site that is sent to a facsimile server portal at the sending site, wherein the email instruction identifies a desired recipient facsimile number and/or recipient email address associated with the recipient facsimile apparatus to thereby automatically attempt to deliver a facsimile transmission from a plurality of different desktop sites through the facsimile portal to desired recipient sites.

15. A method according to claim 1, further comprising automatically attempting to resend selected attempted facsimiles that have predetermined error messages associated therewith.

16. A system for monitoring data associated with the automated transmission of facsimiles to destination sites, comprising:
    means for obtaining electronic data regarding failed facsimile transmissions at a sending site;
    means for generating a general error or fault descriptor message that is descriptive of the likely transmission fault and/or problem based on the obtained electronic data;
    means for identifying the intended target recipient of respective failed facsimile transmissions;
    means for providing an electronic database of a plurality of data fields for each failed transmission, including a first data field for the generated error or fault descriptor message and a second data field for the identity of the intended recipient;
    means for displaying a fault summary report that comprises data from the first and second data fields on a web page so that the fault summary report is electronically accessible by a plurality of users on a plurality of respective displays; and
    means for providing a reference library of predetermined fault or error descriptor messages associated with respective defined general fault codes, and wherein the obtained electronic data includes second fault codes different from the general fault codes and may include textual data, and wherein the means for generating comprises assigning one of the predetermined general fault codes to the obtained electronic data to generate at least a portion of the associated fault descriptor message for the report.

17. A system according to claim 16, further comprising means for automatically directing facsimile transmissions that are sent from a plurality of desktops at a sending site to at least one facsimile portal and then to the respective target recipient sites.

18. A system according to claim 16, wherein the means for providing and displaying use an intranet.

19. A system according to claim 16, further comprising means for automatically generating the fault summary report at least daily.

20. A system according to claim 16, wherein the fault summary report includes data from a third data field that corresponds to the identity of a sender representative responsible for the identified target recipient client or customer and/or fax originator.

21. A system according to claim 16, further comprising means for allowing personnel to electronically access the web page to determine the problem with facsimile transmissions based on the error or fault descriptor message.

22. A system according to claim 16, wherein the fault or error descriptor message in the report includes the number of times the facsimile has been unsuccessfully attempted.

23. A computer usable storage medium embodied with computer readable program codes for monitoring data associated with the automated transmission of facsimiles to target or intended destination sites, the computer-readable program code comprising:
    computer readable program code that is configured to obtain electronic data regarding the failure of attempted, failed and/or incomplete facsimile transmissions at a sending site;
    computer readable program code that is configured to generate a general error or fault descriptor message that is descriptive of the likely transmission fault and/or problem based on the received electronic data;
    computer readable program code that is configured to identify the intended target recipient of respective failed facsimile transmissions;
    computer readable program code that is configured to provide an electronic database of a plurality of data fields for each failed transmission, including a first data field for the generated error or fault descriptor message and a second data field for the identity of the intended recipient;
    computer readable program code that is configured to electronically display a fault summary report that comprises data from the first and second data fields on a web page so that the fault summary report is electronically accessible by a plurality of users on a plurality of respective displays; and
    computer readable program code that is configured to provide a reference library of predetermined fault or error descriptor messages associated with respective defined general fault codes, and wherein the obtained facsimile status data includes second fault codes different from the general fault codes and may include textual data, and wherein the computer readable program code for generating comprises computer readable program code for assigning one of the predetermined general fault codes to the obtained facsimile status data to generate at least a portion of the associated fault descriptor message for the report.

24. A computer usable storage medium according to claim 23, further comprising computer readable program code for automatically directing facsimile transmissions that are sent from a plurality of desktops at a sending site to at least one facsimile portal and then to the respective target recipient sites.

25. A computer usable storage medium according to claim 23, wherein the computer readable program code for displaying the report is carried out over an intranet.

26. A computer usable storage medium according to claim 23, further comprising computer readable program code configured to automatically generating the fault summary report at least daily.

27. A computer usable storage medium according to claim 23, wherein the computer readable program code for displaying the fault summary report is configured to display data from a third data field that corresponds to the identity of a sender representative responsible for the identified target recipient client or customer and/or fax originator.

28. A computer usable storage medium according to claim 23, further comprising computer readable program code configured to allow personnel to electronically access the web page to determine the problem with facsimile transmissions based on the error or fault descriptor message.

29. A computer usable storage medium according to claim 23, wherein the fault or error descriptor message in the report includes the number of times the facsimile has been unsuccessfully attempted.

30. A system for monitoring facsimiles having failed or incomplete facsimile transmissions to destination sites, comprising:

an application server responsive to a facsimile portal at a sending site, configured to transmit facsimiles to target recipient sites and to receive electronic data regarding the failed facsimile transmissions at the sending site;

a computer usable storage medium embodied with computer readable program codes, the computer readable program codes comprising:

computer readable program code configured to generate an error or fault descriptor message that is descriptive of the likely transmission fault and/or problem based on the received electronic data associated with the failed transmission;

computer readable program code configured to identify the intended target recipient of respective failed facsimile transmissions;

computer readable program code configured to provide an electronic database of a plurality of data fields for a failed transmission, including a first data field for the generated error or fault descriptor message and a second data field for the identity of the intended recipient;

computer readable program code configured to generate a fault summary report that comprises data from the first and second data fields;

computer readable program code that is configured to provide a reference library of predetermined fault or error descriptor messages associated with respective defined general fault codes, and wherein the obtained facsimile status data includes second fault codes different from the general fault codes and may include textual data, and wherein the computer readable program code for generating comprises computer readable program code for assigning one of the predetermined general fault codes to the obtained facsimile status data to generate at least a portion of the associated fault descriptor message for the report; and a processor in communication with the server and being operatively associated with computer readable program code that presents the fault summary report to a web page so that the fault summary report is electronically accessible by a plurality of users on a plurality of respective displays.

* * * * *